Jan. 6, 1931.    F. WILKES    1,788,072

LUBRICATING APPARATUS

Filed May 9, 1929

INVENTOR
Frederic Wilkes
By Archworth Martin,
Attorney.

Patented Jan. 6, 1931

1,788,072

UNITED STATES PATENT OFFICE

FREDERIC WILKES, OF WILKINSBURG, PENNSYLVANIA

LUBRICATING APPARATUS

Application filed May 9, 1929. Serial No. 361,655.

My invention relates to lubricating apparatus, and more particularly to apparatus that is suitable for lubricating shaft bearings.

One object of my invention is to provide means for supplying lubricant to a shaft bearing at a rate of flow which varies in accordance with the rate of movement of the shaft and which flow will be increased in case the bearing becomes heated.

Another object of my invention is to provide lubricating apparatus that will interrupt the flow of lubricant when the shaft lubricated thereby comes to rest.

Still another object of my invention is to simplify and improve generally lubricating apparatus for shaft bearings and the like.

Figure 1:
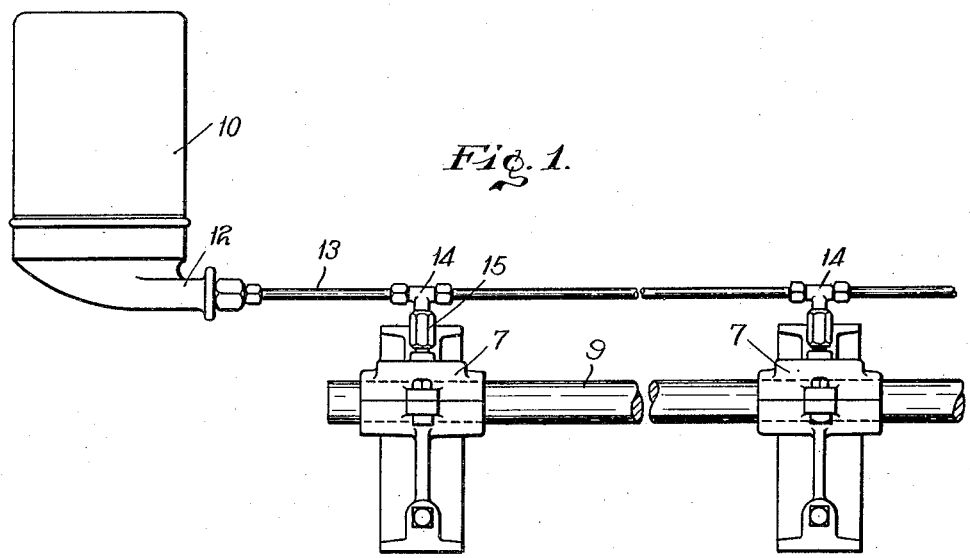
Figures 2, 3, 4:
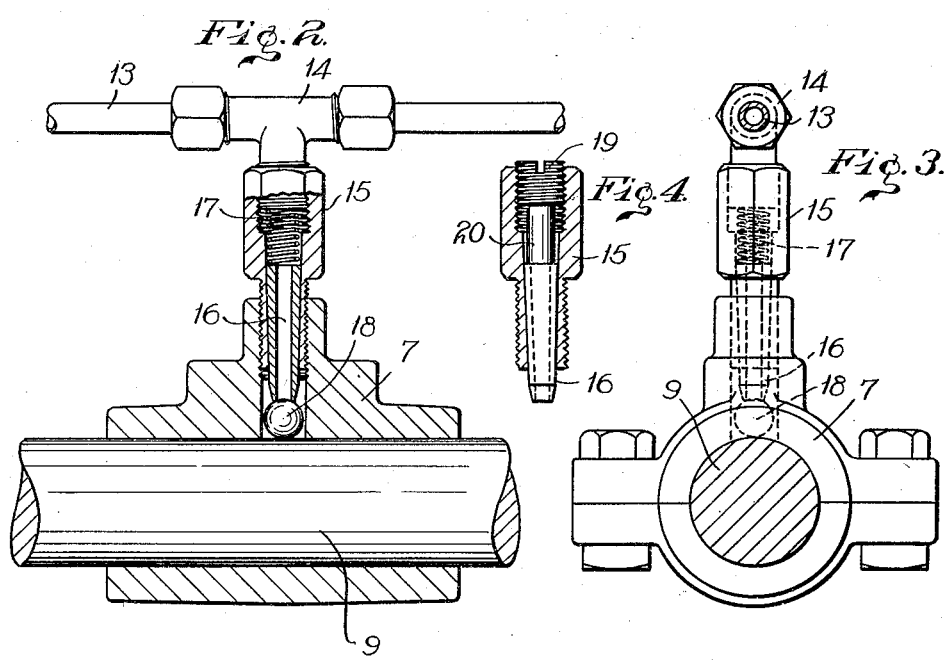

One form which my invention may take is shown in the accompanying drawing wherein Figure 1 is a side elevational view of an installation embodying my invention; Fig. 2 is a view, on an enlarged scale, partially in section, of a portion of the apparatus of Fig. 1; Fig. 3 is an end elevational view of the apparatus of Fig. 2, and Fig. 4 shows means whereby a desired setting of the lubricant supply nozzle may be readily effected in installing the apparatus.

The apparatus may conveniently be installed in such manner that a plurality of bearings will be lubricated from a common source of lubricant supply, thus avoiding the necessity of providing an oil cup at each bearing, with consequent saving in material and labor, since the attendant need only maintain a sufficient quantity of lubricant in the reservoir or other source of supply, instead of attending to each bearing individually.

While I have shown the apparatus as employed in connection with only two bearings, it will be understood that it may be supplied to any number of bearings and such bearings need not be necessarily located in a given plane, but may be distributed over various parts of a machine and even extend to a plurality of machines, since flow of lubricant at each bearing is automatically controlled at such bearing.

The apparatus is shown as applied to two bearings 7, of a shaft 9. These bearings are of somewhat the usual form except instead of being provided individually with oil cups are supplied with lubricant from a common reservoir 10. This reservoir may be simply a chamber of suitable capacity having an outlet 12 to which the supply line 13 is connected, or it may be of special construction such as that shown in my Patent No. 1,579,586 of April 6, 1926.

T connections 14 are provided in the supply line 13 for diverting oil to the bearings 7. A nipple 15 is connected to each T 14 and has screw-threaded engagement with its associated bearing 7, as shown more clearly in Fig. 2. The discharge end of the nipple 15 is tapered somewhat and supports a correspondingly tapered nozzle 16 that is yieldably pressed downwardly by a spring 17 which is interposed between the upper end of the nozzle and the lower end of the T 14. A steel ball 18 is interposed between the discharge end of the nozzle 16 and the shaft, such ball being confined within the lubricating recess of the bearing 7 in such manner that while it may roll under the rotating action of the shaft it will not become displaced from the end of the nozzle. The nipple 15 is screwed down such distance that the spring 17 will be slightly compressed and maintain a yielding force on the ball 18.

In assembling the lubricating nozzle and associated parts in the bearing 7, the ball 18 is placed in the bearing 7, and the nozzle 16 is inserted into the nipple 14, preliminary to screwing the nipple into the bearing. A plug 19 is screwed into the nipple 15 until its extended portion 20 has rigid engagement with the upper end of the nozzle 16. Thereupon the nipple 15 is screwed into place until the nozzle 16 has been moved downwardly into rigid engagement with the ball 18, after which the plug 19 is unscrewed for perhaps one-half turn or a full turn, depending upon the viscosity of the lubricating oil which is to be employed. The nipple 15 is then screwed down until the end 20 of the plug 19, again abuts against the upper end of the nozzle 16. It will be seen that there will thereby be slight clearance provided between the peripheral surface of the nozzle 16 and the adjacent inner surface of the nipple 15. This clearance is so small that lubricant will not flow between said surfaces while the parts remain in such relative positions.

Thereupon, the plug 19 is removed and the spring 17 inserted, and the T 14 is then connected to the nipple 15.

With the parts in this position, lubricant may flow through the line 13 into the nipple 15, the fit between such nipple and the nozzle 16 being such that no lubricant will flow along the outer surface of the nozzle 16 to the shaft 9 by reason of the small clearance above-referred to. The ball 18 will likewise prevent flow of lubricant from the discharge end of the nozzle 16.

However, upon rotation of the shaft 9, the ball 18 will be rotated and lubricant will flow in small quantities from the discharge end of the nozzle 16 and past the ball 18. Upon rapid rotation of the shaft 9, the flow of lubricant will of course be automatically increased and at high speeds where there is perceptible whipping of the shaft, lubricant will not only be supplied more rapidly from within the nozzle 16, but the clearance between such nozzle and the adjacent wall of the nipple 15 will be periodically increased through upward impulses imparted to the nozzle through the ball 18, and additional lubricant will flow down the outer surface of the nozzle 16 to the bearing. Similarly, if the bearing-engaging portion of the shaft 9 becomes heated, it will cause the nozzle 16 to be moved upward slightly thus still further increasing the flow of lubricant.

From the foregoing, it will be seen that any desired number of bearings may be supplied from a given reservoir or other source of supply, and flow to each bearing will be automatically controlled in accordance with changes in conditions existing at such bearing, either through changes in speed of the moving parts or through increase of temperature within the bearing.

I claim as my invention:—

1. The combination with a shaft and a recessed bearing therefor, of lubricating apparatus comprising a nipple connected to said bearing, and having an inwardly-tapering inner surface, a nozzle disposed within said nipple and having a tapering surface co-acting with the first-named tapering surface, a member interposed between the inner end of the nozzle and the shaft, and means for yieldably holding said nozzle in engagement with said member, the clearance between the said tapering surfaces being only sufficient to prevent flow of lubricant therebetween when the parts are at rest, but permitting flow of lubricant upon slight outward movement of the nozzle.

2. The combination with a shaft and a bearing therefor, of lubricating apparatus comprising a nipple communicating with bearing surfaces of said shaft and bearing, the inner wall of said nipple tapering inwardly toward said bearing surfaces and a nozzle disposed within said nipple and having a tapering surface co-acting with the first-named tapering surface, means for yieldably urging said nozzle toward the said bearing surfaces, means for limiting inward movement of such nozzle to an extent that sufficient clearness will be normally maintained between said tapering surfaces to prevent flow of lubricant therebetween when the nozzle is in normal position, and means controlled by movement of the shaft for moving said nozzle outward slightly to permit flow of lubricant between said tapering surfaces.

3. The combination with a shaft and a recessed bearing therefor, of lubricating apparatus comprising an inwardly-tapering valve member extending into said bearing and co-acting with the adjacent wall surface of said recess to control flow of lubricant past said tapering surface, means for yieldably holding said member in inwardly projected position, and means engaging said shaft for limiting inward movement of said member but permitting slight outward movements thereof during rotation of the said shaft.

4. The combination with a shaft and a recessed bearing therefor, of lubricating apparatus comprising an inwardly-tapering valve member extending into said bearing and co-acting with the adjacent wall surface of said recess to control flow of lubricant past said tapering surface, means for yieldably holding said member in inwardly projected position, and means engaging said shaft for limiting inward movement of said member but permitting slight outward movements thereof during rotation of the said shaft, the said means maintaining the tapered surface of the said member in slightly spaced relation to the inner wall of said recess when the member is at its innermost position.

5. Lubricating apparatus for a shaft, comprising a bearing having a lubricating recess, a nipple connected to said bearing and having a nozzle-seating surface, a source of supply for directing lubrication to the outer end of said nipple, a nozzle loosely disposed within the nipple and extending into said recess, a ball interposed between the inner end of the nozzle and the shaft, and means for yieldably holding said nozzle against said ball, the nozzle being inwardly tapered at points opposite to said surface, and the ball normally holding the tapered portion of the nozzle out of engagement with the seating surface and serving to move the nozzle outward a slight distance further during rotation of the shaft, to thereby control flow of lubricant past said surface.

In testimony whereof I, the said FREDERIC WILKES, have hereunto set my hand.

FREDERIC WILKES.